Nov. 18, 1958   STANLEY KUO SHU CHAO ET AL   2,861,191
RADIATION DETECTOR
Filed April 12, 1956
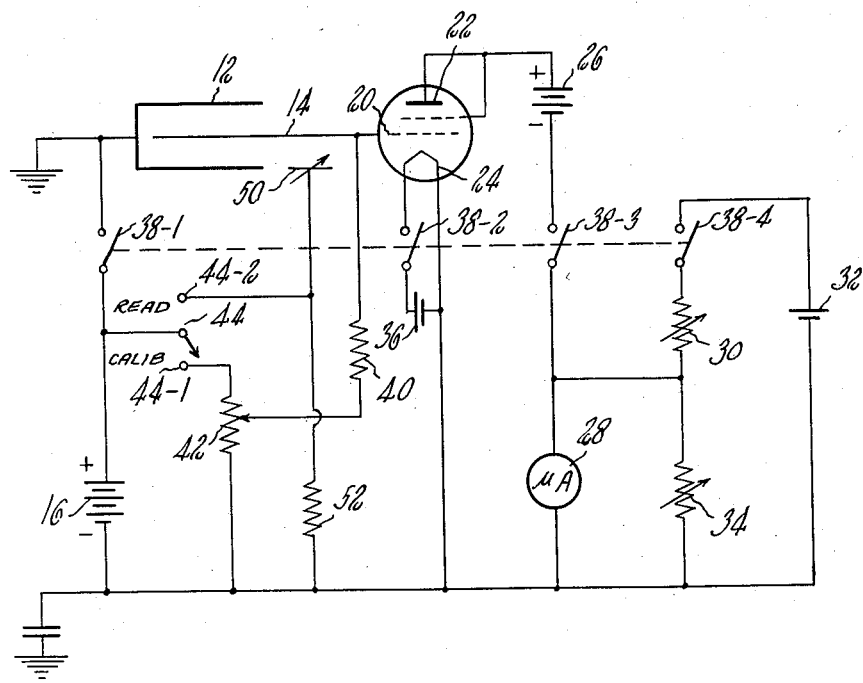

United States Patent Office 2,861,191
Patented Nov. 18, 1958

2,861,191

RADIATION DETECTOR

Stanley Kuo Shu Chao, Cambridge, and Hugh F. Stoddart, South Sudbury, Mass., assignors, by mesne assignments, to Baird-Atomic, Inc., a corporation of Massachusetts Application April 12, 1956, Serial No. 577,771

7 Claims. (Cl. 250—83.6)

This invention relates to the detection of high energy ionizing radiation such as gamma rays, and, more particularly, to a novel radiation survey instrument utilizing an ionization chamber as a radiation responsive device together with electronic means for sensing the intensity of ionization in the chamber.

Radiation survey instruments of the ionization chamber type wherein the floating grid of a vacuum tube is connected to one terminal of said chamber so that the plate current of the tube varies with the state of ionization of said chamber have been known for several years. Such instruments are of relatively simple construction particularly suited for portable use, but heretofore, have been subject to a number of defects which have tended to limit their use to some extent. For example, the problem of calibration was a difficult one, requiring a calibrated radiation source. Also, the instrument recovery speed was far too long, that is, the time required by the instrument to recover to the zero radiation level marking when suddenly withdrawn from a radiation level giving full scale readings. And with logarithmic instruments which are particularly desirable because of the wide range of radiation that may be read without range switching, the lack of a true "zero" causing the indicating meter to read off scale was troublesome.

It is an object of the present invention to provide a novel radiation survey instrument especially useful as a portable instrument and wherein calibration may be provided by a current within the instrument itself rather than by a calibrated radiation source, and without causing switching transients which would produce false readings for some substantial length of time after switching from a "calibrate" to a "read" position.

It is a feature of the invention that complete instrument recovery time is greatly reduced, say to about one minute, enabling many more readings to be made at low ranges within a given time.

It is another feature of the invention that with a logarithmic instrument, a predetermined minimum on-scale reading may be established.

For the purpose of describing further objects and features of the invention, reference is made to the following description of a preferred embodiment thereof, together with the accompanying drawing of a circuit diagram of the radiation survey instrument of the present invention.

Referring to the drawing, the novel radiation survey meter of the present invention in general includes an ionization chamber having an outer cylindrical shell 12 and a central wire 14 spaced therefrom as an inner terminal. Such ionization chambers are well known to the art, and when provided with a voltage between the shell 12 and central wire 14 wherein the wire 14 is negative with respect to shell 12, as by battery 16 connected thereto, positive ions are collected by wire 14. Increase of radiation incident upon the chamber thus causes the wire 14 to become less negative and such voltage change may be sensed to provide an indication of the radiation.

For sensing the voltage change on wire 14, the grid 20 of a triode vacuum tube, preferably a triode connected Raytheon CK5889, is connected thereto, the plate 22 and filamentary cathode 24 of said tube being connected through a suitable source of plate voltage, such as battery 26 to a meter 28 for measuring the variations in plate current caused by radiation incident upon the ionization chamber. If desired, a bucking current may be supplied through adjustable resistor 30 to said meter by battery 32 to cancel the zero radiation level plate current flow through meter 28, and another adjustable resistor 34 may be provided across meter 28 to set the gain of the tube to a desired value. A suitable filament voltage is provided to cathode 24 by battery 36. A four section on-off switch 38–1, 38–2, 38–3, and 38–4 may also be provided as shown.

According to the present invention, resistance means of relatively high value of at least $1 \times 10^{10}$ ohms and more preferably of a value of about $3.3 \times 10^{13}$ ohms is connected between grid 20 and cathode 24, said resistance means comprising mainly a high value resistor 40 preferably having in series therewith an adjustable potentiometer 42 with its sliding arm connected to said resistor 40 and one end connected to cathode 24, the other end of potentiometer 42 being connected to switch 44 at its terminal 44–1 so that in one switch position, the "calibrate" position, a predetermined voltage provided by battery 16 at the sliding arm of potentiometer 42 will establish a predetermined current on grid 20. Such latter current will provide a predetermined plate current flow through meter 28 for calibrating the instrument. In a second position, the "read" position of switch 44, the potentiometer 42 will be disconnected from the positive terminal of battery 16 so that the plate current value read on meter 28 will be logarithmically proportional to the state of ionization of the ionization chamber.

In order to avoid a switching transient caused by the calibrating voltage charge on grid 20, a compensating means is constructed and arranged to provide an opposite, cancelling charge when switch 44 is moved to its "read" position. Thus, a plate 50 adjustably mounted adjacent the wire 14 provides one electrode of a capacitor including as its other electrode said wire 14 and grid 20, said plate being connected to terminal 44–2 of switch 44 and to the negative side of battery 16 through a dropping resistor 52 of relatively high value.

In operation, the on-off switch 38 is first closed and the instrument allowed to warm up to a stable operating condition. The calibration of the instrument, which is principally affected by battery and tube conditions, is then checked by moving switch 44 to its "calibrate" position, thus placing a known current on grid 20 through resistor 40 which will produce a known plate current value. In practice, a range of calibration values is acceptable, and such range may be indicated on the face of meter 28 if desired. Also, if single point calibration be desired, the calibration value is preferably located about midway of the meter scale for least departure at the ends thereof, whereas, if two point calibration is preferred because of its somewhat higher accuracy, the calibration points are located at about one-fourth and three-fourths of full scale. In the latter case, either two values of resistor 40 must be used or two voltages must be applied thereto, with suitable switching. If desired, additional switching may be employed so that the values of batteries 16, 26, 32 and 36 may be individually checked by meter 28.

The instrument is then switched to the "read" position, switch 44 then operating to induce a positive pulse on the grid 20 through plate 50, thus cancelling the negative pulse produced thereon by the calibrating voltage due to the stray capacitance of resistor 40, the electrode being adjusted as by varying its distance from wire 14 such that the net charge deposited on the grid during the switching from "calibrate" to "read" is zero.

Besides making it possible to provide a calibrating current, the resistor 40 performs a number of other functions. Thus, it provides a grid current path and so establishes a predetermined plate current flow when no ionization current is present, providing a minimum meter reading so that the meter will not tend to read off scale due to the lack of a true zero on the logarithmic scale. The resistor 40 also reduces the effective grid circuit time constant at low radio-activity level. This is particularly useful in reducing meter recovery time to less than a minute, compared with five minutes or more for the floating grid circuit described. Finally, the resistor 40 provides useful stabilization of the grid operating point. The choice of the value of resistor 40 is governed principally by the desired position of the "zero" reading, the location of the calibration point, and the calibrating voltage available. A value of at least $1 \times 10^{10}$ appears to be necessary for known electrometer tubes, such as the Victoreen 5803 and 5800 and Raytheon CK5886 and 5889, which might be employed in the instrument of the present invention. It has been found that a value of $3.3 \times 10^{13}$ provides the desired results in the herein described preferred embodiment in which the chamber voltage is 67½ volts, the calibrating voltage is approximately 60 volts, and the plate voltage is 5.2 volts.

Thus it will be seen that the invention provides a novel radiation survey instrument especially for portable use, and one which has many features not heretofore present in such an instrument. Various modifications of the invention within the spirit thereof and the scope of the appended claims will be apparent to those skilled in this art.

We claim:

1. A radiation survey instrument comprising an ionization chamber, vacuum tube means having a plate, cathode and grid, said grid being connected to one terminal of said ionization chamber, resistance means connected between said grid and said cathode, calibrating means including a switch for connecting in one switch position a predetermined voltage to said resistance means to establish a predetermined calibrating grid current and for disconnecting said voltage in a second switch position to provide a grid current greater than said minimum grid current responsive to the ionization of said chamber, and compensating means adjacent said one terminal for compensating the voltage charge on said grid produced in said one switch position by said calibrating means when said switch is moved to said second position to read the state of ionization of said chamber.

2. A radiation survey instrument as claimed in claim 1 wherein the value of said resistance means is at least $1 \times 10^{10}$ ohms.

3. A radiation survey instrument as claimed in claim 1 wherein said compensating means includes an electrode adjacent said terminal forming one electrode of a condenser with said terminal, and means for connecting a predetermined voltage to said electrode when said switch is moved to its second position.

4. A radiation survey instrument comprising an ionization chamber, vacuum tube means having a plate, cathode and grid, said grid being connected to one terminal of said ionization chamber, resistance means connected between said grid and said cathode, calibrating means including a switch for connecting in one switch position a predetermined voltage to said resistance means to establish a predetermined grid current and for disconnecting said voltage in a second switch position to provide a grid current proportional to the state of ionization of said chamber, and compensating means including electrode means adjacent said ionization chamber terminal, and means for connecting a predetermined voltage to said electrode means to compensate the calibrating voltage charge on said ionization chamber terminal.

5. A radiation survey instrument as claimed in claim 4 further comprising means responsive to variations in the plate current of said vacuum tube as controlled by its grid current to indicate the state of ionization of said chamber.

6. A radiation survey instrument as claimed in claim 4 wherein the value of said resistor is about $3.3 \times 10^{13}$ ohms.

7. A logarithmic radiation survey instrument comprising an ionization chamber including a shell and a terminal spaced therefrom, voltage source means for establishing a voltage between said shell and said terminal, vacuum tube means having a plate, cathode and grid, said grid being connected to said ionization chamber terminal, meter means connected between said plate and cathode for indicating plate current, means producing a bucking current through said meter means effective to cancel a portion of said plate current, resistance means of a value of at least $1 \times 10^{10}$ ohms connected between said grid and said cathode, calibrating means including voltage source means and first switch means for connecting in one switch position a predetermined voltage to said resistance means to establish a predetermined voltage at said grid to provide a known plate current through said meter means and for disconnecting said voltage in a second switch position to provide a grid current and a plate current logarithmically proportional to the state of ionization of said chamber, and compensating means including condenser means having an electrode adjacent said ionization chamber terminal, voltage source means, and second switch means for connecting said voltage source means to said electrode to compensate for the calibrating voltage charge on said ionization chamber terminal when said first switch is switched to disconnect said calibrating voltage source to read said state of ionization.

References Cited in the file of this patent

UNITED STATES PATENTS

| | | |
|---|---|---|
| 2,496,886 | Molloy et al. | Feb. 7, 1950 |
| 2,756,347 | White | July 24, 1956 |
| 2,763,790 | Ohmart | Sept. 18, 1956 |
| 2,764,695 | Porter et al. | Sept. 25, 1956 |